US009250641B2

(12) United States Patent
Miyazaki et al.

(10) Patent No.: US 9,250,641 B2
(45) Date of Patent: *Feb. 2, 2016

(54) LOAD DRIVING CIRCUIT AND LOAD DRIVING METHOD

(75) Inventors: Shinichi Miyazaki, Suwa (JP); Katsunori Yamazaki, Matsumoto (JP); Hiroyuki Yoshino, Matsumoto (JP); Kinya Matsuzawa, Shiojiri (JP); Shoichi Iino, Nirasaki (JP)

(73) Assignee: SEIKO EPSON CORPORATION, Tokyo (JP)

( * ) Notice: Subject to any disclaimer, the term of this patent is extended or adjusted under 35 U.S.C. 154(b) by 859 days.

This patent is subject to a terminal disclaimer.

(21) Appl. No.: 13/211,110

(22) Filed: Aug. 16, 2011

(65) Prior Publication Data

US 2011/0298291 A1 Dec. 8, 2011

Related U.S. Application Data

(63) Continuation of application No. 12/483,077, filed on Jun. 11, 2009, now Pat. No. 8,049,368.

(30) Foreign Application Priority Data

Jun. 12, 2008 (JP) ................................ 2008-153907

(51) Int. Cl.
*H02J 1/00* (2006.01)
*H02M 3/02* (2006.01)
*G05F 1/56* (2006.01)

(52) U.S. Cl.
CPC ............... *G05F 1/56* (2013.01); *Y10T 307/647* (2015.04); *Y10T 307/675* (2015.04); *Y10T 307/68* (2015.04); *Y10T 307/696* (2015.04);

(Continued)

(58) Field of Classification Search
CPC .................................. H02J 1/00; H02M 3/02
USPC ....................... 307/43, 70, 75, 76, 85, 86, 87
See application file for complete search history.

(56) References Cited

U.S. PATENT DOCUMENTS 4,257,090 A 3/1981 Kroger et al.
4,628,433 A 12/1986 Notohamiprodjo (Continued)

FOREIGN PATENT DOCUMENTS

JP 52-110454 9/1977
JP 05-088763 4/1993

(Continued)

*Primary Examiner* — Adi Amrany
(74) *Attorney, Agent, or Firm* — Maschoff Brennan

(57) ABSTRACT

A load driving circuit that generates a desired voltage waveform to drive a load includes a target voltage waveform output section that outputs a target voltage waveform to be applied to the load. Power supply sections generate electrical power with voltage values different from each other. Negative feedback control sections between the power supply sections and the load supply electrical power from the corresponding power supply sections to the load and execute negative feedback control of a value of a voltage applied to the load for matching the voltage value and the target voltage waveform. A power supply connection section selects one of the power supply sections based on the value of the voltage applied to the load or the voltage value of the target voltage waveform and connects the selected power supply section to the load and disconnects the rest of the power supply sections from the load.

8 Claims, 10 Drawing Sheets

(52) U.S. Cl.
CPC .......... *Y10T307/724* (2015.04); *Y10T 307/729* (2015.04); *Y10T 307/735* (2015.04)

(56) References Cited

U.S. PATENT DOCUMENTS

| | | | |
|---|---|---|---|
| 4,860,188 | A | 8/1989 | Bailey et al. |
| 5,036,452 | A | 7/1991 | Loftus |
| 5,254,878 | A | 10/1993 | Olsen |
| 5,319,536 | A | 6/1994 | Malik |
| 5,552,643 | A | 9/1996 | Morgan et al. |
| 5,672,958 | A | 9/1997 | Brown et al. |
| 5,883,797 | A | 3/1999 | Amaro et al. |
| 6,031,362 | A | 2/2000 | Bradley |
| 6,140,799 | A | 10/2000 | Thomasson |
| 6,404,076 | B1 | 6/2002 | Matsuda et al. |
| 6,459,171 | B1 | 10/2002 | Leifer |
| 6,614,133 | B2 | 9/2003 | Belson et al. |
| 6,664,660 | B2 | 12/2003 | Tsai |
| 6,664,774 | B2 | 12/2003 | Lethellier |
| 6,674,274 | B2 | 1/2004 | Hobrecht et al. |
| 6,975,494 | B2 | 12/2005 | Tang et al. |
| 7,116,946 | B2 | 10/2006 | Tanabe et al. |
| 7,148,587 | B2 | 12/2006 | Matsuda et al. |
| 7,301,314 | B2 | 11/2007 | Schuellein et al. |
| 7,394,445 | B2 | 7/2008 | Chapuis et al. |
| 7,482,869 | B2 | 1/2009 | Wilson |
| 7,498,695 | B2 | 3/2009 | Gaudreau et al. |
| 7,615,982 | B1 | 11/2009 | Guo |
| 7,821,336 | B2 | 10/2010 | Albrecht et al. |
| 7,836,322 | B2 | 11/2010 | Chapuis et al. |
| 2001/0038277 | A1 | 11/2001 | Burstein et al. |
| 2005/0215209 | A1 | 9/2005 | Tanabe et al. |
| 2006/0291260 | A1 | 12/2006 | Nakashima |
| 2008/0174179 | A1 | 7/2008 | Hirahara et al. |
| 2009/0091307 | A1 | 4/2009 | Lai |
| 2009/0167089 | A1 | 7/2009 | Dishman et al. |
| 2009/0237057 | A1 | 9/2009 | Dishman et al. |
| 2010/0164292 | A1 | 7/2010 | Freeman et al. |

FOREIGN PATENT DOCUMENTS

| | | |
|---|---|---|
| JP | 07-005941 | 1/1995 |
| JP | 07-130484 | 5/1995 |
| JP | 07-170676 | 7/1995 |
| JP | 09-023643 | 1/1997 |
| JP | 10-111723 | 4/1998 |
| JP | 10-293617 | 11/1998 |
| JP | 2002-281770 | 9/2002 |
| JP | 2003-285441 | 10/2003 |
| JP | 2003-323220 | 11/2003 |
| JP | 2006-246682 | 9/2006 |

LOAD DRIVING CIRCUIT AND LOAD DRIVING METHOD

This application is a continuation of U.S. patent application Ser. No. 12/483,077, filed Jun. 11, 2009. The foregoing application is incorporated herein by reference. U.S. patent application Ser. No. 12/483,077 claims priority to Japanese application 2008-153907, filed Jun. 12, 2008.

BACKGROUND

1. Technical Field

The present invention relates to a technology for generating a predetermined voltage waveform, thereby driving a load.

2. Related Arts

Today, quite a number of devices use electricity as energy sources, and have various types of components operating with electricity incorporated therein. Although most of the components incorporated in the devices are arranged to exert predetermined functions only by supplying standardized electrical power, on the other hand, there are many components (components operating in an analog manner) which require power supply with a precisely controlled voltage value or voltage waveform in order for exerting predetermined functions. Further, the devices incorporating such components operating in an analog manner also incorporate dedicated circuits (driving circuits) for generating electric power with target voltage values or voltage waveforms to drive such analog-like components. It should be noted that the component driven by the driving circuit may sometimes be called a load of the driving circuit (or simply a load).

In such driving circuits, it is required to supply electrical power with the most accurate possible voltage value or voltage waveform. Therefore, the voltage supplied to the load may sometimes be detected to perform negative feedback control (feedback control) so that the voltage becomes a target voltage. Further, there is proposed a technology, in the case of driving a plurality of loads, attempting to use counter-electromotive force generated in one load for driving of another load in order for reducing power consumption (e.g., JP-A-9-23643, JP-A-2002-281770).

However, since these proposed technologies are not applicable unless a plurality of loads are driven and the loads are types of load generating counter electromotive force, there arises a problem that the scope of application is significantly limited.

SUMMARY

An advantage of some aspects of the invention is to provide a load driving circuit providing a driving technology capable of reducing the power consumption, and adopts the following configurations.

A load driving circuit according to an aspect of the invention is adapted to generate a desired voltage waveform to drive a load, and includes a target voltage waveform output section adapted to output a target voltage waveform to be applied to the load, a plurality of power supply sections generating electrical power with voltage values different from each other, a plurality of negative feedback control sections disposed between the power supply sections and the load so as to correspond respectively to the power supply sections, and adapted to supply electrical power from the respective power supply sections to the load, and execute negative feedback control of a value of a voltage applied to the load for matching the voltage value and the target voltage waveform with each other, and a power supply connection section adapted to select one of the power supply sections based on one of the value of the voltage applied to the load and the voltage value of the target voltage waveform, and connect the selected power supply section to the load and disconnect the rest of the power supply sections from the load.

Further, a load driving method according to another aspect of the invention corresponds to the load driving circuit described above and is adapted to generate a desired voltage waveform to drive a load, including the steps of outputting a target voltage waveform to be applied to the load, generating electrical power with voltage values different from each other from a plurality of power supply sections, selecting one of the power supply sections based on one of a value of a voltage applied to the load and a voltage value of the target voltage waveform, and executing a negative feedback control of a value of a voltage to be applied to the load for receiving the electrical power from the selected power supply section to supply the load with the electrical power, and matching the value of the voltage applied to the load and the target voltage waveform with each other.

In the load driving circuit and the load driving method according to the aspects of the invention, there is provided a plurality of power supply sections generating electrical power with voltage values different from each other. Further, the negative feedback control sections are provided to the respective power supply sections, and the target voltage waveform to be applied to the load is input to each of the negative feedback control sections. As a result, it becomes possible in each of the negative feedback control sections to supply the load with the electrical power received from the corresponding power supply section while performing the negative feedback control along the target voltage waveform. Further, one power supply section (and the negative feedback control section) is selected among the plurality of power supply sections (and the negative feedback control sections) thus configured based on the value of the voltage applied to the load or the voltage value of the target voltage waveform and is connected to the load, and at the same time, the remaining power supply sections (and the negative feedback control sections) are disconnected from the load.

By adopting such a configuration, it is possible to drive the load using the power supply section selected among the plurality of power supply sections generating the electrical power with voltage values different from each other in accordance with the value of the voltage to be applied. Therefore, since the difference between the value of the voltage generated in the power supply section and the value of the voltage applied to the load can be made smaller, the electrical power consumed between the power supply section and the load can be reduced. As a result, it becomes possible to reduce the power consumed when driving the load. Further, since nothing is required other than providing a plurality of power supply sections with values of generation voltages different from each other and negative feedback control sections, and driving the load while switching the power supply sections and the negative feedback control sections, the configuration can be applied to any types of loads.

Further, in the load driving circuit according to the aspect of the invention, in the case of driving the load (the load capable of storing at least a part of the electrical power supplied thereto) including a capacitive component, the following is also possible. Firstly, power supply sections capable of storing the electrical power supplied thereto are used as the power supply sections. For example, a power supply capacitor (preferably having a capacitance sufficiently larger than the capacitance of the load) has previously been incorporated in the power supply section. Further, when the value of the voltage applied to the load rises, the load is driven using the power supply section generating the voltage with a value higher than the value of the voltage applied to the load. In contrast, when the value of the voltage applied to the load decreases, the load is driven using the power supply section generating the voltage with a value lower than the value of the voltage applied to the load.

By adopting such a configuration, the electrical power supplied from the power supply sections (the power supply capacitor) is stored in the load during the period in which the value of the voltage applied to the load is rising, and when the value of the voltage applied to the load decreases, the electrical power stored in the load is refluxed to the power supply section (the power supply capacitor) and stored therein. Further, when the value of the voltage applied to the load subsequently rises, it is possible to drive the load using the electrical power refluxed from the load and stored in the power supply section (the power supply capacitor). As a result, it becomes possible to significantly reduce the electrical power for driving the load.

Further, in the load driving circuit according to the aspect of the invention, the following configuration can also be adopted. Firstly, a variable resistance section having a variable resistance value has previously been disposed between each of the power supply sections and the load, and it is arranged that the negative feedback control can be executed on the resistance value of the variable resistance section using the resistance value control section so that the value of the voltage applied to the load and the target voltage waveform match with each other. Further, it is also possible to configure that during the period in which the output of the resistance value control section is supplied to the variable resistance section to execute the negative feedback control on the resistance value, the electrical power is supplied to the load from the power supply section connected to the variable resistance section, and in contrast, when electrically disconnecting the output of the resistance value control section and the variable resistance section from each other, the resistance value of the variable resistance section increases to a substantially infinite value to disconnect the power supply section, which is connected to the variable resistance section, from the load.

By adopting such a configuration, since the load driving circuit can be configured using universal components with sufficient reliability such as operational amplifiers or transistors, it becomes possible to simply and easily configure the driving circuit with high reliability.

Although a plurality of negative feedback circuits is formed in the load driving circuit according to the aspect of the invention configured as described above, not all of the circuits perform the negative feedback control at a time, and only one of the negative feedback circuits can actually perform the negative feedback control. Therefore, it is also possible to adopt the configuration in which the resistance value control section for controlling the resistance value is shared by a plurality of variable resistance sections, and used while switching the variable resistance sections.

By adopting such a configuration, since it becomes unnecessary to provide the corresponding number of resistance value control sections to the number of power supply sections, the configuration of the load driving circuit can be simplified.

Further, in the load driving circuit according to the aspect of the invention described above, the following is also possible. Firstly, the values of the voltages generated by the respective power supply sections have previously been detected. Then, when selecting the power supply section for driving the load, it is also possible to select the power supply section based not only on the value of the voltage applied to the load, but also on the values of the voltages generated by the respective power supply sections.

By adopting such a configuration, since the load can be driven always using the appropriate power supply section even in the case in which the value of the voltage generated by the power supply section becomes unstable, it become possible to significantly reduce the power consumption.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, the embodiments will be explained in the following order.

A. Outline of the Embodiments
B. First Embodiment
  B-1. Configuration of Resistive Load Driving Circuit
  B-2. Operation of Resistive Load Driving Circuit
C. Second Embodiment
  C-1. Configuration of Capacitive Load Driving Circuit
  C-2. Operation of Capacitive Load Driving Circuit
D. Modified Examples
  D-1. First Modified Example
  D-2. Second Modified Example

A. Outline of the Embodiments

As the load driving circuit of the invention, various forms of embodiments, which will hereinafter be explained, can be considered, and before all, the outline common to the embodiments will briefly be explained for the sake of convenience of better understanding.

Figure 1:
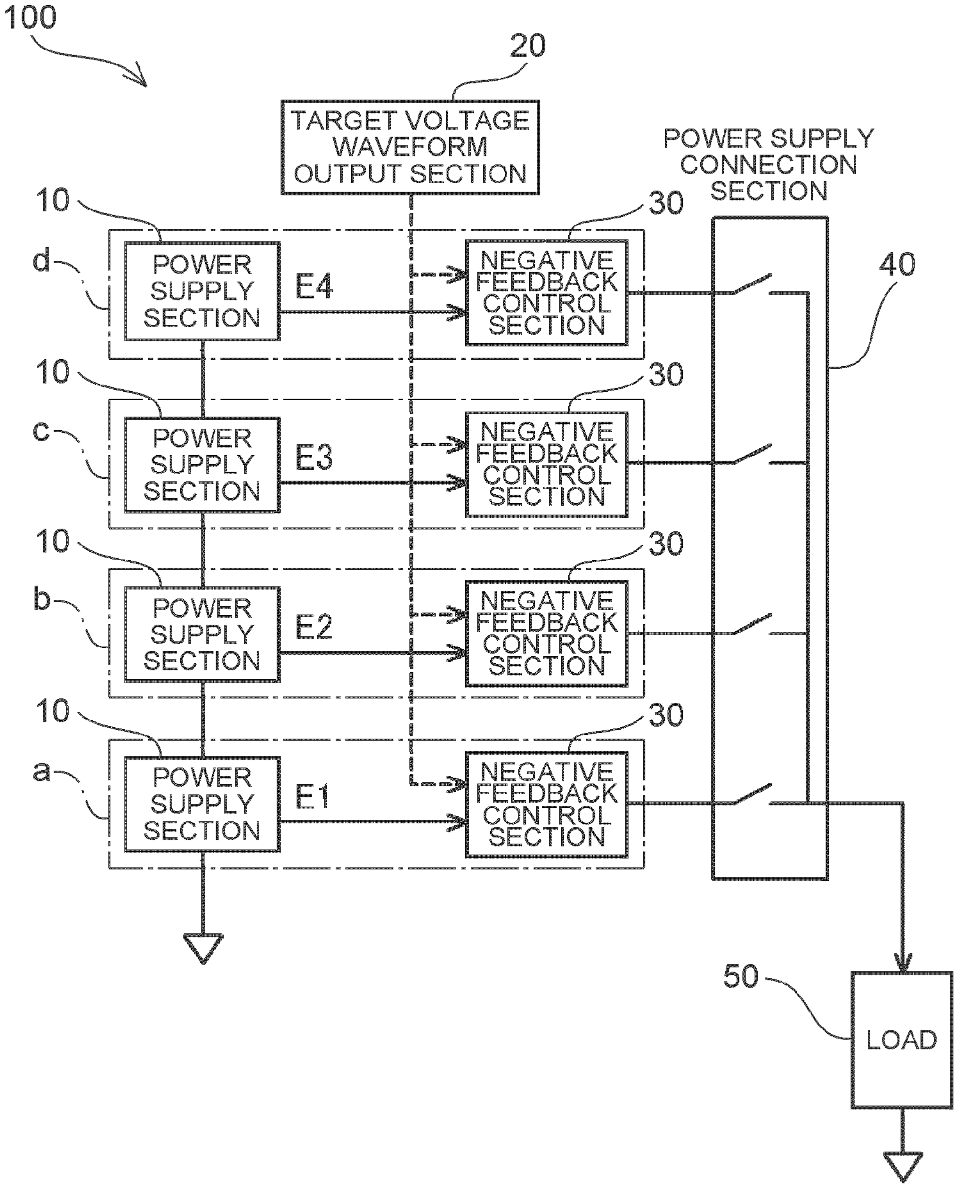
FIG. 1 is an explanatory diagram showing a rough configuration of a load driving circuit of the present embodiments.

FIG. 1 is an explanatory diagram showing a rough configuration of a load driving circuit 100 of the present embodiments. Although various configurations can be assumed as a specific circuit configuration, when focusing attention on the function, it is conceivable that either circuit configuration is composed of a plurality of elements as shown in the drawings. Specifically, a plurality of power supply sections 10 for generating electrical power supplied to the load 50 is provided, and each of the power supply sections 10 is provided with a negative feedback control section 30. Further, the load driving circuit 100 is provided with a target voltage waveform output section 20 for outputting a target voltage waveform to be applied to the load 50. Further, it is arranged that when receiving the target voltage waveform from the target voltage waveform output section 20, each of the negative feedback control sections 30 provided respectively to the power supply sections 10 can supply the load 50 with the electrical power generated in the power supply section 10 while performing the negative feedback control so that the voltage value applied to the load 50 matches the target voltage waveform.

In other words, it is conceivable that each of the sets of the power supply section 10 and the negative feedback control section 30 corresponding to the power supply section 10 forms a small drive circuit, so to speak. Further, it is arranged that the target voltage waveform output section 20 supplies the target voltage waveform, thereby making it possible to drive the load 50. In FIG. 1, each of the power supply sections 10 and the corresponding negative feedback control section 30 are surrounded by a rectangular of a thin dashed line, thereby representing that each of them forms a small driving circuit. Further, the power supply sections 10 generate electrical power with voltage values different from each other. In the example shown in the drawing, there are disposed four power supply sections 10, and the voltage values generated by the respective power supply sections 10 are E1, E2, E3, and E4 (wherein E1<E2<E3<E4), respectively. It is obvious that the number of power supply sections 10 is not limited to four, but can be an arbitrary number equal to or greater than two.

A power supply connection section 40 selects one power supply section 10 (i.e., the driving circuit including the power supply section 10) among the plurality of power supply sections 10 based on the voltage value applied to the load 50 or the voltage value of the target voltage waveform output by the target voltage waveform output section 20. For example, when the voltage value to be applied to the load 50 is low, the power supply connection section 40 selects the driving circuit including the power supply section 10 with a low voltage value. In the example shown in FIG. 1, the driving circuit denoted with "a" or the driving circuit denoted with "b" is to be selected. Further, when the voltage value to be applied is high, the power supply connection section 40 selects the driving circuit (the driving circuit denoted with "c" or "d" in the example shown in FIG. 1) including the power supply section 10 with a high voltage value, and when an intermediate voltage value is to be applied, the power supply connection section 40 selects the driving circuit (the driving circuit denoted with "b" or "c" in the example shown in FIG. 1) including the power supply section 10 with an intermediate voltage value. Then, the power supply connection section 40 connects the driving circuit (i.e., the power supply section 10 and the negative feedback control section 30) thus selected to the load 50, and disconnects the other driving circuits from the load 50. Then, the feedback control section 30 of the driving circuit connected to the load 50 becomes to drive the load 50 using the electrical power from the power supply section 10 while performing the negative feedback control along the target voltage waveform supplied from the target voltage waveform output section 20.

As described above, the load driving circuit 100 of the present embodiments is provided with the plurality of power supply sections 10 differing in a generating voltage value and the negative feedback control sections 30 corresponding respectively to the power supply sections 10. Further, the load driving circuit 100 drives the load 50 while switching the power supply sections 10 and the negative feedback control sections 30 in accordance with the voltage value to be applied to the load 50. Since the power supply sections 10 and the negative feedback control sections 30 are switched in accordance with the voltage value to be applied as described above, it is possible to reduce the voltage difference between the voltage value generated in the power supply section 10 and the voltage value applied to the load 50. As a result, it becomes possible to reduce the power consumption in the negative feedback control section 30 and the power supply connection section 40 intervening between the power supply sections 10 and the load 50. Further, since the switching of the power supply sections 10 and the negative feedback control sections 30 is performed only in accordance with the voltage value to be applied to the load 50, it becomes possible to apply the configuration when driving any types of load 50 regardless of, for example, the number of loads and whether or not the load generates counter electromotive force.

It should be noted that although an arbitrary number equal to or greater than two can be taken as the number of power supply sections 10 as described above, the larger the number of power supply sections 10 becomes, the more the voltage difference between the voltage value generated in the power supply section 10 and the voltage value applied to the load 50 can be reduced, and it becomes possible to further reduce the power consumption.

Further, in the example shown in FIG. 1, the power supply connection section 40 is disposed between the negative feedback control section 30 and the load 50. However, FIG. 1 conceptually shows the functions included in the load driving circuit 100, but does not show a specific configuration of the load driving circuit 100. Further, as described above, the function of the power supply connection section 40 is to connect or disconnect the small driving circuits each composed of the power supply section 10 and the negative feedback control section 30 to or from the load 50 in accordance with the voltage value to be applied thereto. Therefore, it is not necessarily required to dispose the power supply connection section 40 between the negative feedback control section 30 and the load 50 providing such a function can be realized, and it is also possible to disposed the power supply connection section 40, for example, between the power supply sections 10 and the negative feedback control sections 30.

The same can be applied to the power supply sections 10 and the negative feedback control sections 30. For example, FIG. 1 shows the case in which the power supply sections 10 are coupled in series. However, the power supply sections 10 can also be disposed in a separate manner providing the electrical power with the voltage values different from each other can be generated. Further, regarding the negative feedback control sections 30, there is no need for the negative feedback control sections 30 to be completely isolated from each other as shown in FIG. 1, and it is also possible to adopt a configuration of using a part thereof in common. Hereinafter, such a load driving circuit 100 of the present embodiments as described above will specifically be explained.

B. First Embodiment

B-1. Configuration of Resistive Load Driving Circuit

Figure 2:
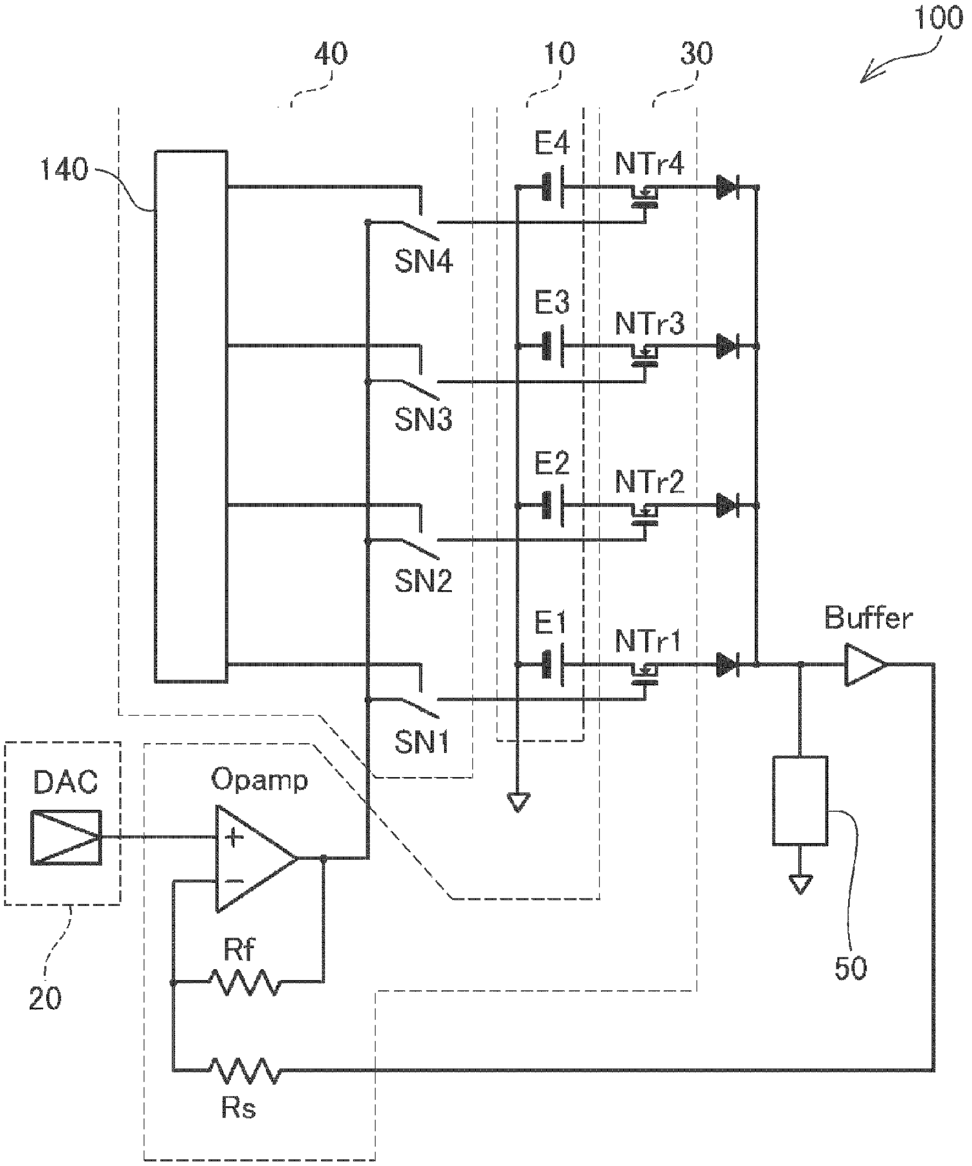
FIG. 2 is an explanatory diagram exemplifying a configuration of a load driving circuit of a first embodiment.

FIG. 2 is an explanatory diagram exemplifying a configuration of a load driving circuit of a first embodiment. In the example shown in the drawing, there is adopted a configuration in which four power supplies E1 through E4 are disposed, and the electrical power generated by the power supplies E1 through E4 is connected to the load 50 via unipolar NMOS transistors NTr1 through NTr4. It should be noted that as the power supplies E1 through E4, any power supplies such as primary batteries, secondary batteries, mere capacitors, or so-called power supply circuits can be used providing the power supplies generate voltage values different from each other. Further, the transistors NTr1 through NTr4 are not limited to the unipolar transistors, but other types of transistors such as bipolar transistors can also be used therefor. Further, regarding the load 50, although any types of load 50 can be driven, the explanations will be presented in the first embodiment assuming that the load 50 is a resistive load.

It should be noted that the reason why diodes are inserted between the transistors NTr1 through NTr4 and the load 50 in FIG. 2 is because the unipolar transistors used in the present embodiment have vertical transistor structures for high-power driving, in which a parasitic diode formed between the drain and the source may cause a back-flow of the current, and the back-flow of the current needs to be prevented. Although not shown in the drawing, in the case shown in FIG. 2, it is assumed that the parasitic diode is incorporated in the orientation with the anode facing the load and the cathode facing the power supply. Therefore, when the voltage of the load becomes higher than the voltage of the power supply (E1 through E4), forward bias is applied to the parasitic diode of the transistor, which causes the back-flow of the current flowing from the load to the power supply via the parasitic diode even if the transistor is in an off state. Therefore, the diode is inserted with the orientation for blocking the back-flow. It should be noted that the diode becomes unnecessary in the case of using the transistors (e.g., bipolar transistors) not causing the back-flow of the current.

The gate electrode of each of the transistors NTr1 through NTr4 is coupled to an output terminal of an operational amplifier Opamp. It should be noted that a pull-down arrangement is applied to the gate electrode of each of the transistors NTr1 through NTr4 in order for preventing malfunctions, which is omitted from the drawing in order for preventing the drawing from becoming complicated. As well known to the public, when applying a positive voltage between the gate electrode and the source electrode, the NMOS transistor is provided with a path of charge (electrons here) called a channel formed inside the transistor. Further, the higher the value of the voltage applied between the gate electrode and the source electrode is set, the larger channel is formed to make the charge easy to pass through (to reduce the equivalent resistance value), or in contrast, if the value of the voltage applied between the gate electrode and the source electrode is lowered, it becomes difficult for the charge to pass through to increase the equivalent resistance value.

It should be noted that PMOS transistors can also be used as the transistors NTr1 through NTr4 instead of the NMOS transistors. As shown in FIG. 2, in the case of using the NMOS transistors, the transistors are arranged so that the drain electrodes are connected to the power supply (E1 through E4) side and the source electrodes are connected to the load 50 side. In contrast, in the case of using the PMOS transistors, the transistors are arranged so that the source electrodes are connected to the power supply (E1 through E4) side and the drain electrodes are connected to the load 50 side. Further, in the case of the PMOS transistors, a negative voltage is applied between the gate electrode and the source electrode, thereby performing the control.

The operational amplifier Opamp is provided with two input terminals. One of the input terminals is provided with an analog voltage output from the DA converter (hereinafter described as DAC), and the other of the input terminals is provided with the voltage applied to the load 50 via the input resistor Rs. Further, the output of the operational amplifier Opamp is fed-back to the input terminal via the feedback resistor Rf, thereby forming a so-called negative feedback circuit.

For example, if the value of the voltage applied to the load 50 is lower than the analog voltage output by the DAC, the output of the operational amplifier Opamp increases to raise the voltage applied to the gate electrode, thus the equivalent resistance value of the transistor is reduced. As a result, since an amount of voltage drop in the transistor decreases, the value of the voltage applied to the load 50 is increased. In contrast, when the value of the voltage applied to the load 50 rises beyond the analog voltage output by the DAC, the output of the operational amplifier Opamp decreases, and therefore, the voltage applied to the gate electrode decreases to increase the equivalent resistance value of the transistor. As a result, since an amount of voltage drop in the transistor increases, the value of the voltage applied to the load 50 is decreased. Thus, the value of the voltage applied to the load 50 can be varied in accordance with the analog voltage output from the DAC.

It should be noted that the load driving circuit 100 shown in FIG. 2 combines the transistors NTr1 through NTr4 with the operational amplifier Opamp to perform the negative feedback control of the value of the voltage applied to the load 50, as described above. Therefore, the negative feedback circuits composed of the respective transistors NTr1 through NTr4 and the operational amplifier Opamp corresponds to the negative feedback control sections 30 shown in FIG. 1. Further, the DAC outputting the analog voltage to the operational amplifier Opamp corresponds to the target voltage waveform output section 20 shown in FIG. 1. It should be noted that if the load 50 and the input resistor Rs are coupled directly, the load 50 may be influenced in some cases, and therefore, a buffer circuit Buffer is inserted between the load 50 and the operational amplifier Opamp in order for preventing the influence. Therefore, in the case in which the influence is negligible, for example, in the case in which the resistance of the load 50 is sufficiently smaller than that of the input resistor Rs, the buffer circuit Buffer can be eliminated.

Further, the output from the operational amplifier Opamp is connected to the gate electrodes of the transistors NTr1 through NTr4 via switches SN1 through SN4, respectively, and the switches SN1 through SN4 are controlled by a gate selector circuit 140. The gate selector circuit 140 has a function of detecting the analog voltage output by the DAC and the value of the voltage (the output voltage of the operational amplifier Opamp in some cases) applied to the load 50 to put either one of the switches SN1 through SN4 into the connected state while putting the other switches into the disconnected state. Since the pull-down arrangement is applied to the gate electrodes of the transistors NTr1 through NTr4, as described above, when the switch is put into the disconnected state, the voltage is no more applied to the gate electrode of the transistor corresponding to the switch. As a result, the channel in the transistor disappears to stop the current flowing, and there is created the state in which the power supply disposed on the upstream side of the transistor is electrically disconnected from the load 50.

As described above, in the load driving circuit 100 shown in FIG. 2, the gate selector circuit 140 puts the switches SN1 through SN4 into the connected state to connect the power supplies E1 through E4 to the load 50, and by contraries, puts the switches SN1 through SN4 into the disconnected state to disconnect the power supplies E1 through E4 from the load 50. Therefore, the gate selector circuit 140 and the switches SN1 through SN4 correspond to the power supply connection section 40 shown in FIG. 1.

B-2. Operation of Resistive Load Driving Circuit

Figure 3A:
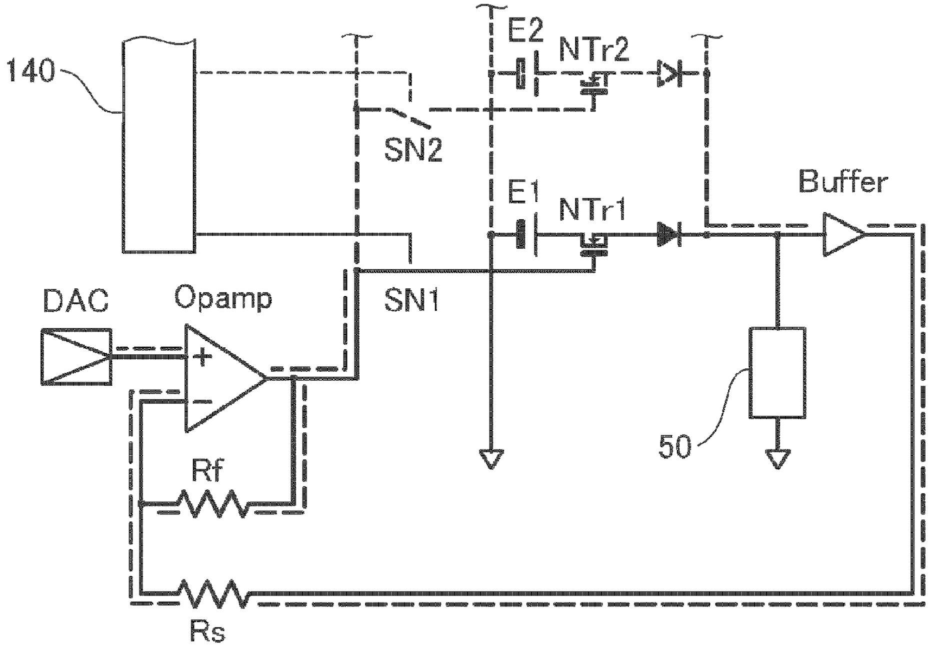
FIGS. 3A and 3B are explanatory diagrams showing the operation of the load driving circuit of the first embodiment driving a load.
Figure 3B:
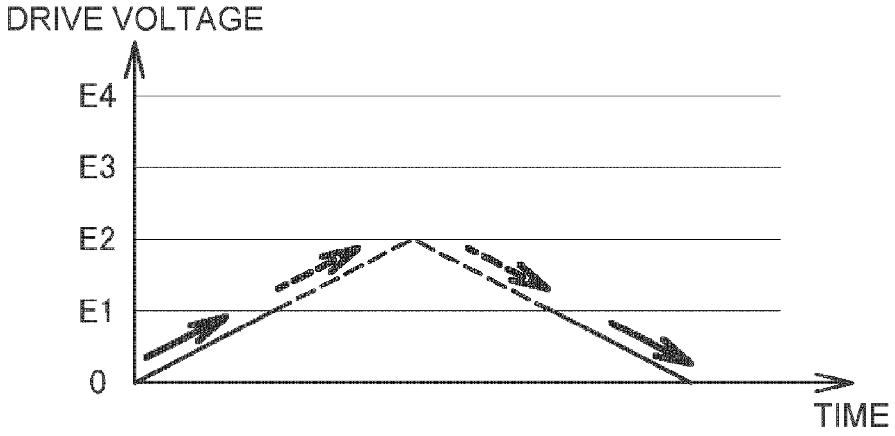

FIGS. 3A and 3B are explanatory diagrams showing the operation of the load driving circuit 100 of the first embodiment driving the load 50. For the sake of convenience of explanations, it is assumed hereinafter that the power supply E1 generates the electrical power with a voltage value E1, the power supply E2 generates the electrical power with a voltage value E2, the power supply E3 generates the electrical power with a voltage value E3, and the power supply E4 generates the electrical power with a voltage value E4. Further, the voltage values satisfy the inequality expression of E1<E2<E3<E4.

The case in which the analog voltage output from the DAC increases from 0(V) is now considered. As described above using FIG. 2, the analog voltage output from the DAC forms the target voltage to be applied to the load 50. In the case in which the target voltage to be applied to the load 50 stays around 0 (V), the gate selector circuit 140 puts the switch SN1 into the connected state (switches it ON), and puts the other switches SN2 through SN4 into the disconnected state (switches them OFF). As a result, the power supply E1 with the lowest voltage value of the power supplies E1 through E4 is coupled to the load 50, and the transistor NTr1 and the operational amplifier Opamp form the negative feedback circuit, thus the negative feedback control is performed so that the value of the voltage applied to the load 50 matches the output of the DAC. FIG. 3A illustrates with thick solid lines how the negative feedback circuit is formed with the transistor NTr1 and the operational amplifier Opamp. As a result, the electrical power of the power supply E1 is applied to the load 50 via the transistor NTr1 and the diode.

Here, the equivalent resistance value of the transistor NTr1 can be reduced by raising the voltage applied to the gate electrode, and the smaller the equivalent resistance value is made, the higher the value of the voltage applied to the load 50 can be made. However, as is obvious, it is not achievable to raise the voltage beyond the voltage value (i.e., E1) generated by the power supply E1. Further, in a strict sense, it is not achievable to make the equivalent resistance value of the transistor NTr1 completely zero, and the diode also has some small amount of resistance. Therefore, it is not achievable to raise the value of the voltage applied to the load 50 beyond the voltage value, which is lower than the voltage value generated by the power supply E1 as much as the voltage drop caused in the transistor NTr1, the diode, and so on.

As described above, there is an upper limit value in the value of the voltage applied to the load 50 by the negative feedback circuit illustrated with the thick solid lines in FIG. 3A. Therefore, when the value of the voltage (or the value of the voltage applied to the load 50) output by the DAC exceeds the upper limit value, the gate selector circuit 140 detects that the voltage value exceeds the upper limit, and puts the switch SN1 into the disconnected state (switches it OFF) while putting the switch SN2 into the connected state (switching it ON). As a result, the negative feedback circuit (the circuit illustrated with the thick solid lines in FIG. 3A) composed of the transistor NTr1 and the operational amplifier Opamp is switched to the new negative feedback circuit (the circuit illustrated with thick broken lines in FIG. 3A) composed of the transistor NTr2 and the operational amplifier Opamp, and the power supply for supplying the load 50 with the electrical power is switched from the power supply E1 to the power supply E2 in conjunction therewith. As described above, since the power supply E2 generates electrical power with a voltage value higher than that of the power supply E1, by thus switching the power supplies, even if the value of the voltage output by the DAC becomes higher, it becomes possible to raise the value of the voltage applied to the load 50 in accordance therewith.

It is obvious that the value of the voltage, which can be applied by the power supply E2 to the load 50 also has an upper limit value. However, if the value of the voltage output by the DAC (or the value of the voltage applied to the load 50) reaches the upper limit value, it is then possible to switch OFF the switch SN2 and to switch ON the switch SN3, thereby supplying the load 50 with the electrical power using the power supply E3.

FIG. 3B shows how the voltage is applied to the load 50 while switching the negative feedback circuit and the power supply in accordance with the value of the voltage to be applied. As shown in FIG. 3B, the electrical power generated by the power supply E1 is supplied to the load 50 using the negative feedback circuit illustrated with the thick solid lines in FIG. 3A until the voltage (the drive voltage) to be applied to the load 50, which rises from 0(V), reaches E1. It should be noted that since some little voltage drop is caused in the transistors NTr1 through NTr4 and the diodes in a strict sense, it is only possible to apply the voltage with a value, which is lower than the value E1 of the voltage generated by the power supply E1, to the load 50. However, in order for preventing the explanations from becoming cumbersome and complicated, it is assumed here that the voltage drops caused in the transistors NTr1 through NTr4 and the diodes are negligible.

When the voltage (the drive voltage) to be applied to the load 50 rises beyond the voltage value E1, the electrical power from the power supply E2 is supplied to the load 50 using the negative feedback circuit illustrated with the thick broken lines in FIG. 3A. In the case in which the voltage applied to the load 50 is reduced in the present state, it is possible to execute the operation opposite to that of the case of increasing the voltage. Firstly, the voltage value output from the DAC is reduced while keeping the states of the switches SN1 through SN4. Then, the output from the operational amplifier Opamp decreases to lower the voltage applied to the gate electrode of the transistor NTr2, and therefore, the equivalent resistance value of the transistor increases. Further, since it is assumed here that the load 50 is a resistive load, when the equivalent resistance value of the transistor increases, the value of the voltage applied to the load 50 is lowered. Then, when the voltage to be applied is reduced to the voltage value E1, the switch SN2 is switched OFF while switching ON the switch SN1, thereby switching the negative feedback circuit from the circuit illustrated with the thick broken lines to the circuit illustrated with the thick solid lines in FIG. 3A. After thus switching the negative feedback circuit, the more the equivalent resistance value of the transistor NTr1 included in the new circuit is increased, the more the value of the voltage applied to the load 50 can be reduced.

As described above, in the load driving circuit 100 of the first embodiment, the range of the voltage, which can be applied to the load 50, is divided into four voltage ranges, namely 0(V) through E1, E1 through E2, E2 through E3, and E3 through E4, and the power supply and the negative feedback circuit are previously set for each of the voltage ranges. Further, when the voltage to be applied to the load 50 is within either one of the voltage ranges, the load 50 is driven using the power supply and the negative feedback circuit corresponding to that voltage range, but if the drive voltage of the load 50 exceed a boundary of the voltage ranges, the power supply and the negative feedback circuit are switched, and the load 50 is driven using the power supply and the negative feedback circuit corresponding to the new voltage range. According to this operation, it becomes possible to reduce the power consumption when driving the load 50. The reason therefor will hereinafter be explained.

Figure 4A:
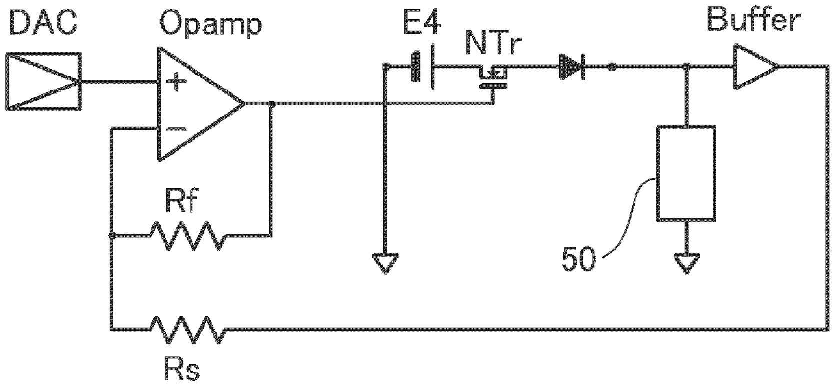
FIGS. 4A and 4B are explanatory diagrams exemplifying a comparative load driving circuit for driving a load using a single power supply and a single negative feedback circuit.
Figure 4B:
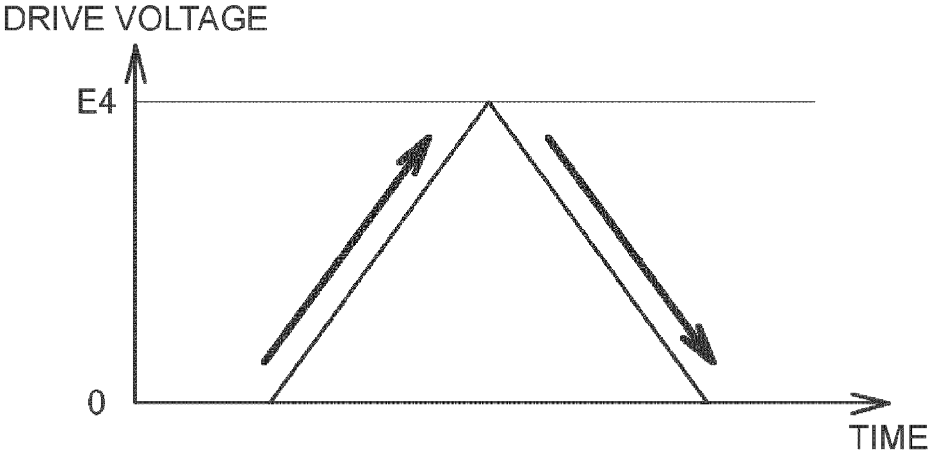

FIGS. 4A and 4B are explanatory diagrams exemplifying, for comparison, a load driving circuit for driving the load 50 using a single power supply and a single negative feedback circuit. FIG. 4A shows a specific circuit configuration, and FIG. 4B shows how the drive voltage of the load 50 is raised from 0(V) to the voltage value E4 and then dropped to the original point of 0(V). As described above, in order for applying the voltage to the load 50 in a range of 0(V) through E4, it is required to use the power supply generating the voltage value equal to or higher than at least E4. It should be noted that although the value of the voltage generated by the power supply must be higher than E4 in view of the resistance of the transistors NTr, the diodes, and so on, it is assumed here that the resistance of the transistors NTr, the diodes, and so on is negligible for the sake of easier understanding.

The power supply E4 constantly generates the electrical power with the voltage value E4. Therefore, in the driving circuit shown in FIG. 4A, the voltage with the value E4 is always applied to the upstream side of the transistor NTr irrespective of the voltage value of the drive voltage to be applied to the load 50. Further, when dropping the voltage value E4 to the drive voltage to be applied to the load 50, the power is consumed inside the transistor NTr. The larger the voltage difference (i.e., the voltage difference between the upstream side and the downstream side of the transistor NTr) with which the transistor NTr operates becomes, the more the amount of power consumption increases. As a result, in the driving circuit shown in FIG. 4A, a significantly large amount of power is consumed in the case in which the drive voltage to be applied to the load 50 is low.

In contrast, the load driving circuit 100 of the first embodiment shown in FIG. 2 is provided with the four power supplies E1 through E4 generating voltages with values different from each other, and the negative feedback circuits corresponding respectively to the power supplies. Further, as described above using FIGS. 3A and 3B, the load driving circuit 100 drives the load 50 while switching the power supplies E1 through E4 and the corresponding negative feedback circuits in accordance with which one of the voltage ranges of 0(V) through E1, E1 through E2, E2 through E3, and E3 through E4 the drive voltage to be applied to the load 50 belongs.

Figure 5:
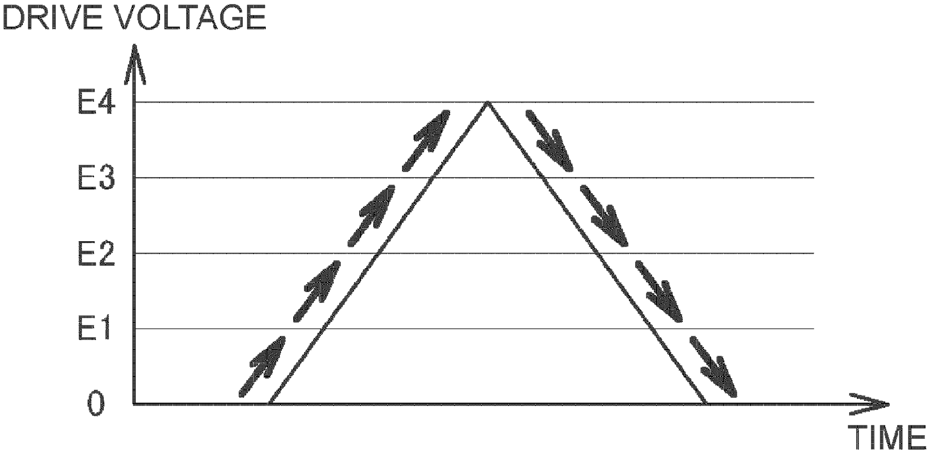
FIG. 5 is an explanatory diagram showing the reason why the power consumption can be reduced in the load driving circuit of the first embodiment.

FIG. 5 shows how the load 50 is driven while switching the power supplies E1 through E4 in the load driving circuit 100 of the first embodiment. Therefore, in the case in which the drive voltage to be applied to the load 50 is within the voltage range of 0 (V) through E1, for example, the electrical power is supplied from the power supply E1, and therefor, only the voltage value E1 is applied to the transistor NTr1. Further, even in the case in which the drive voltage to be applied to the load 50 rises into the voltage range of E1 through E2, the power supply for supplying the electrical power is switched to the power supply E2, and therefore, only the voltage value E2 is applied to the transistor NTr2. Even in the case in which the drive voltage for the load 50 further rises, by switching the power supply for supplying the load 50 with the electrical power to the power supply E3, then the power supply E4, it becomes possible to reduce the voltage difference with which the transistors NTr1 through NTr4 operate to the voltage difference at most as much as 0(V) through E1, E1 through E2, E2 through E3, or E3 through E4. As a result, it becomes possible to significantly reduce the power consumption compared to the load driving circuit in the related art driving the load 50 using the single power supply and the single negative feedback circuit as shown in FIG. 4A.

It should be noted that the explanations are presented hereinabove assuming that the drive voltage applied to the load 50 takes 0(v) or a positive voltage value. However, it is also possible to apply the drive voltage taking a negative value by using a power supply generating a voltage with a negative value. It is obvious that it becomes possible to apply the drive voltage with a voltage value varying from a negative value to a positive value to the load 50 by using a power supply generating a negative voltage value and a power supply generating a positive voltage value.

Figure 6:
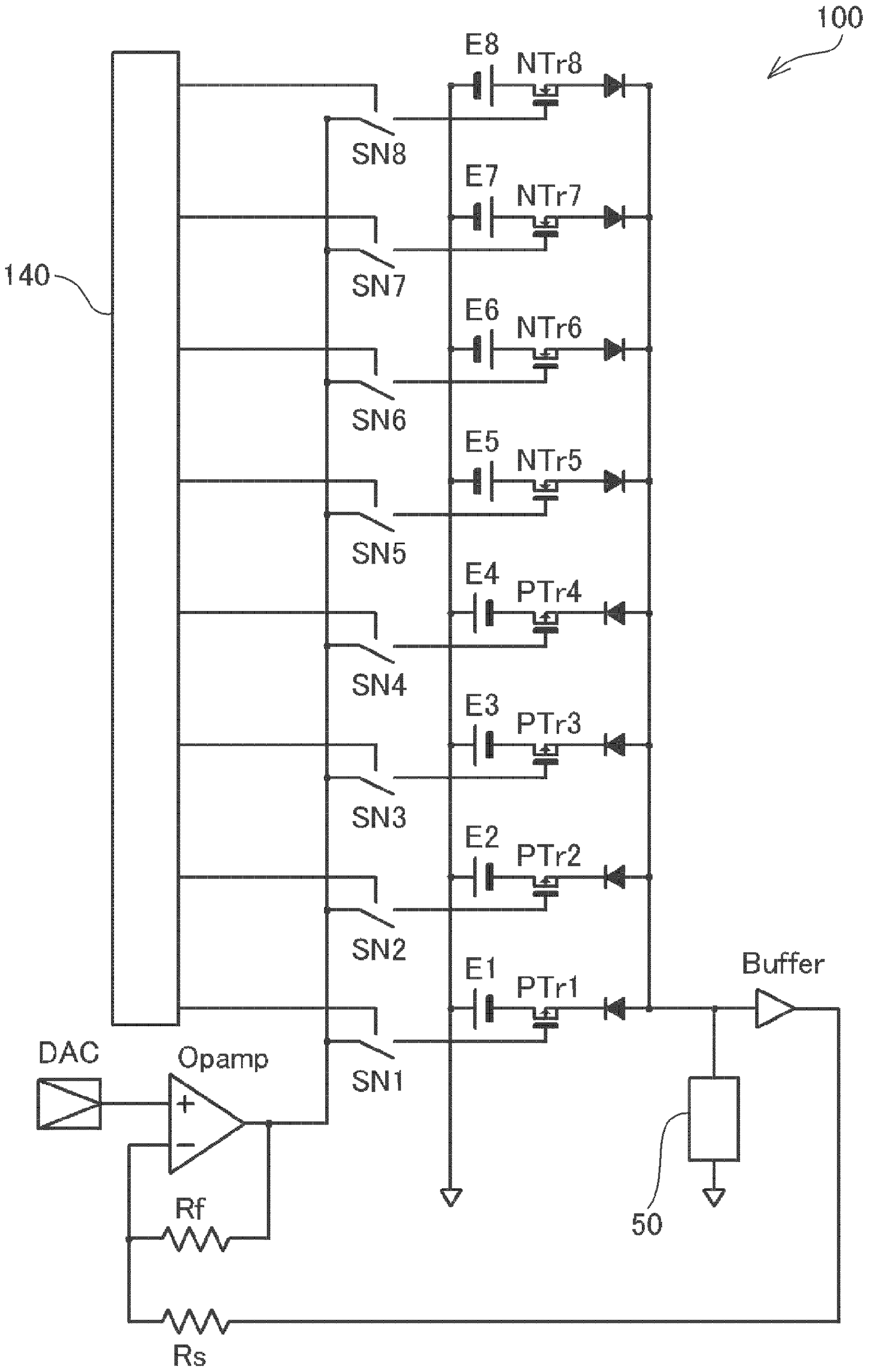
FIG. 6 is an explanatory diagram exemplifying a load driving circuit capable of applying a drive voltage with a voltage value varying from a negative value to a positive value to a load.

FIG. 6 is an explanatory diagram exemplifying the load driving circuit 100 capable of applying a drive voltage with a voltage value varying from a negative value to a positive value to a load 50. In the example shown in the drawing, although four power supplies E5 through E8 generate the electrical power with a positive voltage value similarly to the case with the load driving circuit 100 shown in FIG. 2, the four power supplies E1 through E4 generate the electrical power with a negative voltage value. Further, in conjunction therewith, the four power supplies E5 through E8 are respectively provided with NMOS transistors (NTr5 through NTr8) having the drain electrodes coupled respectively to the power supplies (E5 through E8) and the source electrodes coupled to the load 50 side. In contrast, the four power supplies E1 through E4 are respectively provided with the PMOS transistors (PTr1 through PTr4) having the drain electrodes coupled respectively to the power supplies (E1 through E4) and the source electrodes coupled to the load 50 side. Further, regarding the PMOS transistors (PTr1 through PTr4), the diodes for preventing back-flow are inserted between the PMOS transistors and the load 50 with orientations (so that the direction from the drain electrodes of the transistors PTr1 through PTr4 towards the load 50 matches the forward direction of the diodes) opposite to those of the diodes for the NMOS transistors (NTr5 through NTr8).

Further, assuming that the levels of the values E1 through E8 of the voltage generated by these power supplies satisfy the inequality of $E1<E2<E3<E4<O<E5<E6<E8<E8$, if the drive voltage applied to the load 50 takes a positive voltage value, it is possible to apply the drive voltage in a range of 0(V) through E8 (a positive voltage value) to the load 50 by switching the switch to be switched ON from the switch SN5 to the switch SN8 as the voltage value grows. Further, if the drive voltage to be applied takes a negative voltage value, it becomes possible to apply the drive voltage in a range of 0(V) through E1 (a negative voltage value) to the load 50 by switching the switch to be switched ON from the switch SN4 towards the switch SN1 as the voltage value decreases (the absolute value thereof increases).

C. Second Embodiment

In the first embodiment described hereinabove, the explanations are presented assuming that the load 50 is a resistive load. However, in the case in which the load 50 is a capacitive load, it becomes possible to more significantly reduce the power consumption. It should be noted here that the capacitive load is a load having a characteristic of storing at least a part of the electrical power supplied thereto, and a load incorporating a piezoelectric element can be cited as a representative example thereof. Further, liquid crystal panels constitutionally cause large parasitic capacitances, and therefore, can also be regarded as capacitive loads. Further, by applying the load driving circuit 100 of the second embodiment to a load composed of a capacitive load and a resistive load coupled in parallel to each other, the power consumption can significantly be reduced. Hereinafter, the load driving circuit 100 of the second embodiment for driving such a capacitive load 50 will be explained.

C-1. Configuration of Capacitive Load Driving Circuit

Figure 7:
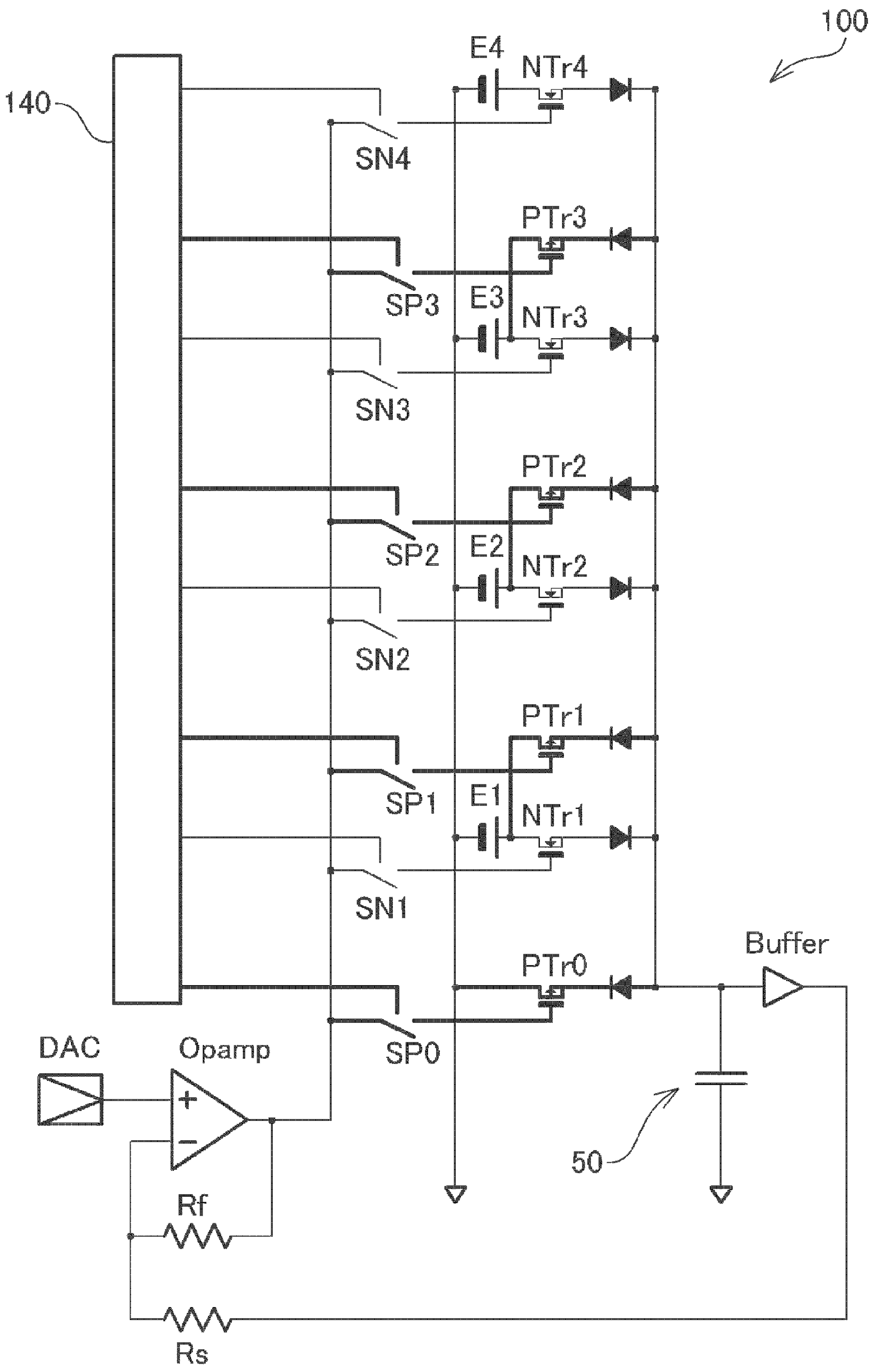
FIG. 7 is an explanatory diagram exemplifying a configuration of a load driving circuit of a second embodiment.

FIG. 7 is an explanatory diagram exemplifying a configuration of the load driving circuit 100 of the second embodiment. Similarly to the load driving circuit 100 of the first embodiment shown in FIG. 2, the load driving circuit 100 of the second embodiment is also provided with the four power supplies E1 through E4, which generate electrical power with the voltage values of E1, E2, E3, and E4, respectively. Further, the electrical power from the power supplies E1 through E4 is connected to the load 50 via the unipolar NMOS transistors NTr1 through NTr4, respectively.

It should be noted that also in the second embodiment, any power supplies such as primary batteries, secondary batteries, mere capacitors, or so-called power supply circuits can be used as the power supplies E1 through E4, providing the power supplies generate voltages with the values different from each other. However, in the second embodiment, the power supplies such as secondary batteries or capacitors capable of storing at least a part of electrical power supplied from the outside are used, thereby making it possible to more significantly reduce the power consumption. This point will be explained later in detail.

Further, as shown in FIG. 7, the load driving circuit 100 of the second embodiment is provided with unipolar PMOS transistors PTrO through PTr3 with orientations for refluxing the electrical power from the load 50 to the ground or the power supplies E1 through E3 in contrast to the load driving circuit 100 of the first embodiment shown in FIG. 2. It should be noted that the transistors PTrO through PTr3 are not limited to the unipolar transistors, but other types of transistors such as bipolar transistors can also be used therefor. Further, although the diodes for preventing back-flow are also inserted between the transistors PTrO through PTr3 and the load 50, in the case of using the transistors (e.g., bipolar transistors) with a structure not causing the back-flow, the diodes can be eliminated.

The output terminal of the operational amplifier Opamp is connected to the gate electrodes of the transistors NTr1 through NTr4 for supplying the load 50 with the electrical power of the power supplies E1 through E4 via the switches SN1 through SN4, respectively. This configuration is substantially the same as that of the load driving circuit 100 of the first embodiment shown in FIG. 2. However, as described above, the load driving circuit 100 of the second embodiment is also provided with the transistors PTrO through PTr3 for refluxing the electrical power of the load 50, and the output terminal of the operational amplifier Opamp is also connected to the gate electrodes of these transistors PTrO through PTr3, and switches SPO through SP3 are disposed between the respective gate electrodes and the output terminal of the operational amplifier Opamp. It should be noted that a pull-up arrangement is applied to the gate electrode of each of the transistors PTrO through PTr3 in order for preventing malfunctions, which is omitted from the drawing in order for preventing the drawing from becoming complicated.

The gate selector circuit 140 switches the states of the switches SN1 through SN4 and the switches SPO through SP3 between an ON state and an OFF state. Further, depending on which one of the switches SN1 through SN4 and SPO through SP3 is switched ON, a negative feedback circuit is formed with the corresponding transistor NTr1 through NTr4 or PTrO through PTr3 and the operational amplifier Opamp. As a result, it becomes possible to execute the negative feedback control on the value of the voltage applied to the load 50 so that the voltage follows the analog voltage output by the DAC. This point will hereinafter be explained in detail.

C-2. Operation of Capacitive Load Driving Circuit

Figure 8A:
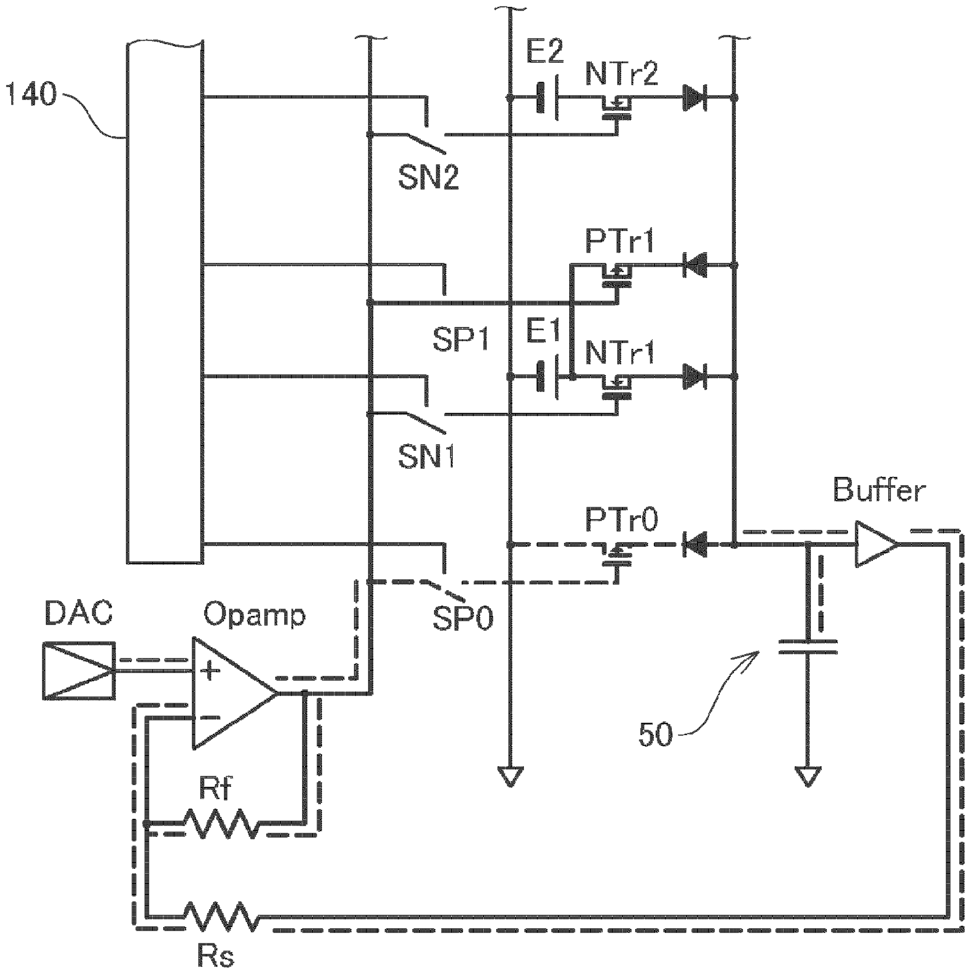
FIGS. 8A and 8B are explanatory diagrams showing the operation of the load driving circuit of the second embodiment driving a capacitive load.
Figure 8B:
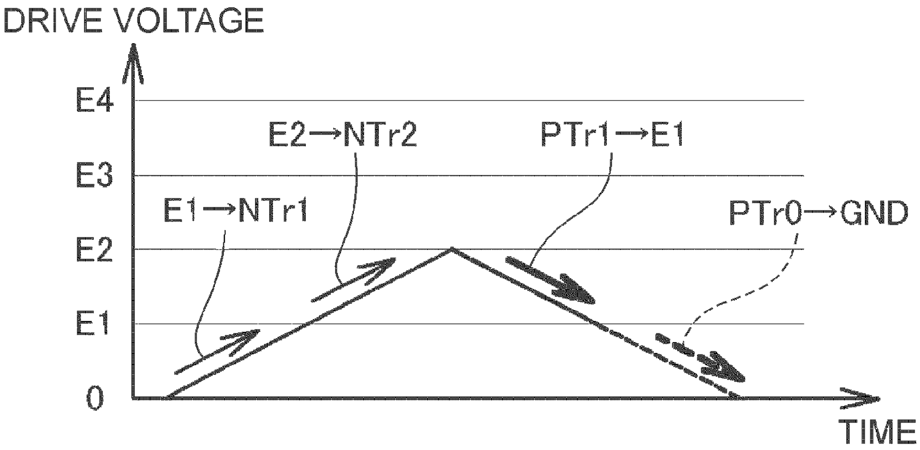

FIGS. 8A and 8B are explanatory diagrams showing the operation of the load driving circuit 100 of the second embodiment driving the capacitive load 50. It should be noted that also in the second embodiment, it is assumed that the power supplies E1, E2, E3, and E4 respectively generate the electrical power with voltage values E1, E2, E3, and E4, and the voltage values satisfy the inequality of 0 (V)<E1<E2<E3<E4. Further, in order for preventing the explanations from becoming complicated, it is also assumed in the second embodiment that internal resistances of the transistors NTr1 through NTr4 and PTrO through PTr3, the diodes, and so on are negligible.

In the case in which the drive voltage (the analog voltage output by the DAC) to be applied to the load 50 increases, the load driving circuit 100 of the second embodiment operates in the completely the same manner as in the first embodiment described above using FIGS. 3A and 3B. Specifically, in the case in which the drive voltage is within the voltage range of 0(V) through E1, the gate selector circuit 140 switches ON the switch SN1, and at the same time, switches OFF all of the other switches (the switches SN2 through SN4 and SPO through SP3). As a result, the negative feedback circuit composed of the transistor NTr1 and the operational amplifier Opamp is formed, and the electrical power of the power supply E1 is applied to the load 50 along the analog voltage output by the DAC. Further, when the drive voltage to be applied to the load 50 exceeds the value of the voltage the power supply E1 can supply, the gate selector circuit 140 switches OFF the switch SN1, and at the same time, switches ON the switch SN2. As a result, the negative feedback circuit composed of the transistor NTr1 and the operational amplifier Opamp is switched to the negative feedback circuit composed of the transistor NTr2 and the operational amplifier Opamp, to start supplying the electrical power of the power supply E2 to the load 50.

FIG. 8B shows an action of supplying the load 50 with the electrical power from the power supply E1 via the transistor NTr1 while the drive voltage is rising from 0(V) towards E1, and supplying the load 50 with the electrical power from the power supply E2 via the transistor NTr2 while the drive voltage is rising from E1 towards E2. As described above, during the period in which the drive voltage to be applied to the load 50 is rising, it is sufficient to sequentially switch the power supply for supplying the load 50 with the electrical power by switching the switches SN1 through SN4.

In contrast, in the case in which the drive voltage (the analog voltage output by the DAC) to be applied to the load 50 decreases, the gate selector circuit 140 switches OFF all of the switches SN1 through SN4, and at the same time, switches ON either one of the switches SPO through SP3 in accordance with the drive voltage. For example, the case of reducing the drive voltage from E2 towards E1 will be considered. In the case in which the drive voltage is within the range of E1 through E2, and is lowered, the gate selector 140 switches ON the switch SP1. Then, the output of the operational amplifier Opamp is input to the gate electrode of the transistor PIr1 to form a channel by the hole inside the transistor PIr1, thereby electrically connecting the load 50 and the power supply E1 to each other. Since the voltage value E2 has been applied to the load 50, the electrical power stored in the load 50 is refluxed to the power supply E1. Then, in the case in which the power supply E1 is the power supply such as a secondary battery capable of storing the electrical power supplied externally, it is possible to drive the load 50 using the stored electrical power, and therefore, it becomes possible to significantly reduce the power consumption.

Further, the lower the voltage applied to the gate electrode of the transistor PIr1 becomes, the smaller the equivalent resistance value of the transistor PIr1 becomes. Therefore, the negative feedback circuit is formed by inputting the analog voltage (the target voltage to be applied to the load 50) output by the DAC and the drive voltage actually applied to the load 50 into the operational amplifier Opamp, and applying the output of the operational amplifier Opamp to the gate electrode, thereby making it possible to control the drive voltage applied to the load 50. For example, in the case in which the drive voltage applied to the load 50 is higher than the target voltage output by the DAC, since the output of the operational amplifier Opamp decreases, the equivalent resistance value of the transistor PTr1 is reduced. As a result, the drive voltage applied to the load 50 is reduced to come closer to the target voltage output by the DAC.

In FIG. 8A the negative feedback circuit formed by the transistor PTr1 and the operational amplifier Opamp when the switch SP1 is switched ON is illustrated with thick solid lines. By dropping drive voltage of the load 50 from the voltage value E2 to the voltage value E1 while executing the negative feedback control in the manner as described above, the electrical power stored in the load 50 is refluxed to the power supply E1 via the transistor PTr1, and as a result, the drive voltage is gradually lowered. In FIG. 8B how the electrical power of the load 50 is refluxed to the power supply E1 via the transistor PTr1 is illustrated with a thick solid directional line.

When the drive voltage of the load 50 becomes lower than the voltage value E1, the switch SP1 is switched OFF and the switch SPO is switched ON using the gate selector circuit 140. As a result, the negative feedback circuit (the circuit illustrated with the thick solid lines in FIG. 8A) composed of the transistor PTr1 and the operational amplifier Opamp is switched to a new negative feedback circuit composed of the transistor PTrO and the operational amplifier Opamp. In FIG. 8A, the new negative feedback circuit thus switched is illustrated with thick broken lines. As a result, the electrical power stored in the load 50 is released to the ground via the transistor PTrO, and the drive voltage applied to the load 50 is lowered in conjunction therewith. In FIG. 8B how the electrical power of the load 50 is released to the ground via the transistor PTrO is illustrated with a thick broken directional line. Further, in the case in which the drive voltage is made to rise again in the state of thus reducing the drive voltage, it is possible to switch ON the switch corresponding to the present voltage value among the switches SN1 through SN4 as described above.

As described above, also in the load driving circuit 100 of the second embodiment, the range of the voltage, which can be applied to the load 50, is divided into four voltage ranges, namely 0 (V) through E1, E1 through E2, E2 through E3, and E3 through E4, and the power supplies E1 through E4 having charge of the respective voltage ranges have been set previously. Further, in the case of raising the drive voltage to be applied to the load 50, the power supply having charge of the voltage range is connected to the load 50, and the drive voltage is applied to the load 50 while performing the negative feedback control. For example, it is arranged that if the drive voltage is in between the voltage value E1 and the voltage value E2, the load 50 is driven using the power supply E2 having charge of the voltage range of E1 through E2. In contrast, in the case in which the drive voltage to be applied to the load 50 is to be reduced, the power supply having charge of the voltage range one step lower than the present voltage is coupled to the load 50. Then, the drive voltage applied to the load 50 is reduced by executing the negative feedback control while refluxing the electrical power stored in the load 50 to the power supply. For example, in the case in which the drive voltage is in between the voltage value E1 and the voltage value E2, the power supply E1 having charge of the voltage range of 0 (V) through E1 is coupled to the load 50, thereby storing the electrical power of the load 50 in the power supply E1. According to this operation, it is possible to reduce the power consumption when driving the load 50. In particular in the case in which the power supplies E1 through E4 are the power supplies such as secondary batteries or capacitors capable of storing at least a part of the electrical power supplied from the outside, it becomes possible to further significantly reduce the power consumption. The reason therefor will hereinafter be explained.

Figure 9:
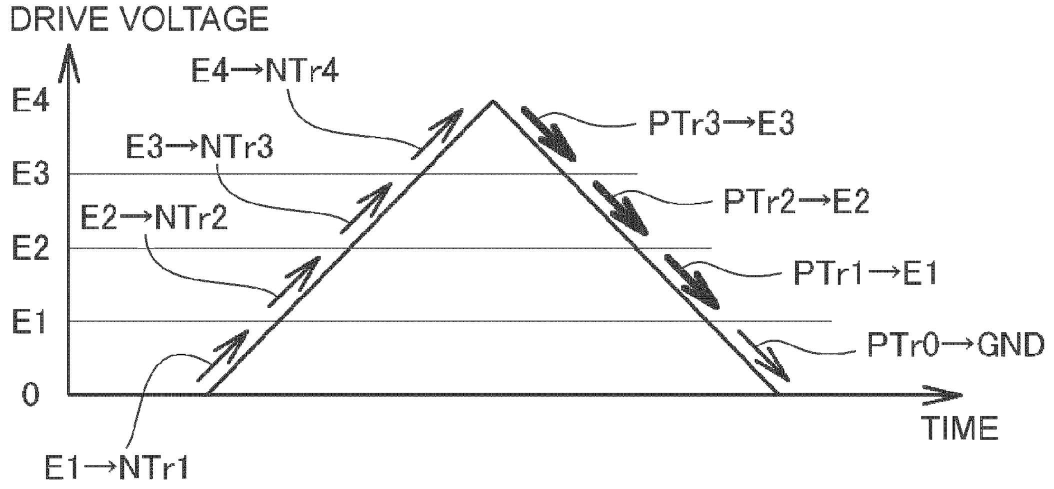
FIG. 9 is an explanatory diagram showing the reason why the power consumption can be reduced in the load driving circuit of the second embodiment.

FIG. 9 is an explanatory diagram showing an action of raising the drive voltage applied to the load 50 from 0 (V) to E4 in the load driving circuit 100 of the second embodiment, and then reducing the driving voltage from E4 to 0(V). As described above, when raising the drive voltage from 0(V) to E1, the drive voltage is raised while supplying the load 50 with the electrical power via the transistor NTr1 by switching ON the switch SN1. When the drive voltage reaches E1, the drive voltage is raised while supplying the load 50 with the electrical power of the power supply E2 via the transistor NTr2 by switching OFF the switch SN1 and switching ON the switch SN2. When the drive voltage reaches E2, the load 50 is supplied with the electrical power of the power supply E3 via the transistor NTr3 by switching OFF the switch SN2 and switching ON the switch SN3. Further, when the drive voltage reaches E3, the load 50 is supplied with the electrical power of the power supply E4 via the transistor NTr4 by switching OFF the switch SN3 and switching ON the switch SN4. FIG. 9 shows the action of gradually raising the drive voltage applied to the load 50 while switching the power supplies E1 through E4 in such a manner as described above. On this occasion, the voltage difference with which each of the transistors NTr1 through NTr4 operates is at most the difference in the voltages generated by the respective power supplies E1 through E4, namely the voltage difference as much as 0(V) through E1, E1 through E2, E2 through E3, or E3 through E4. Therefore, the power consumption can be reduced with substantially the same mechanism as that of the load driving circuit 100 of the first embodiment.

Then, when reducing the drove voltage from E4, firstly the switch SN4 is switched OFF, and then the switch SP3 is switched ON. Then, the electrical power stored in the load 50 is refluxed to the power supply E3 via the transistor PTr3, and the drive voltage applied to the load 50 is reduced in conjunction therewith. In this occasion, if the power supply E3 is a power supply capable of storing the electrical power supplied, the electrical power refluxed from the load 50 is to be stored in the power supply E3. When the drive voltage of the load 50 is reduced to the voltage value E3, the electrical power of the load 50 is then refluxed to the power supply E2 via the transistor PTr2 by switching OFF the switch SP3 and switching ON the switch SP2. Further, when the drive voltage of the load 50 is reduced to the voltage value E2, the electrical power of the load 50 is refluxed to the power supply E1 via the transistor PTr1 by switching OFF the switch SP2 and switching ON the switch SP1. If the power supply E2 or the power supply E1 is capable of storing the electrical power, the electrical power refluxed from the load 50 is stored in the power supply E2 or the power supply E1. When the drive voltage is reduced to the voltage value E1, the switch SP1 is switched OFF and the switch SPO is switched ON at the end. Then, the electrical power of the load 50 is released to the ground via the transistor PTrO, and the drive voltage applied to the load 50 is reduced to 0(V) in conjunction therewith.

FIG. 9 shows the action of gradually reducing the drive voltage applied to the load 50 while refluxing the electrical power stored in the load 50 to the power supply generating the electrical power with the lower voltage value in such a manner as described above. On this occasion, the voltage difference with which each of the transistors PTrO through PTr3 operates is also at most the difference in the voltages generated by the respective power supplies E1 through E4, namely the voltage difference as much as 0(V) through E1, E1 through E2, E2 through E3, or E3 through E4. Therefore, the power consumption can be reduced with substantially the same mechanism as that of the load driving circuit 100 of the first embodiment.

Further, since the load 50 is the capacitive load, in the load driving circuit 100 of the second embodiment, the power consumption can further significantly be reduced by adopting the power supply, such as a secondary battery, capable of storing the electrical power supplied from the outside as the power supplies E1 through E3 to which the electrical power is refluxed from the load 50. The arrow illustrated with thick solid lines in FIG. 9 represents the action of reducing the drive voltage while storing the electrical power refluxed from the load 50 to the power supplies E1 through E3.

By storing the electrical power from the load 50 in the power supplies when reducing the drive voltage as described above, the electrical power thus stored can be used when subsequently raising the drive voltage. For example, when subsequently raising the drive voltage in the range of 0(V) through E1, the electrical power is to be supplied from the power supply E1. In this case, by supplying the electrical power having been refluxed from the load 50 and stored, the drive voltage of the load 50 can be raised without substantially supplying any new electrical power. Since the electrical power from the load 50 is similarly stored in the power supplies E2 and E3, when raising the drive voltage in the range of E1 through E2, and when further raising the drive voltage in the range of E2 through E3, by supplying the load 50 with the electrical power having been stored in the power supplies E2 and E3, the drive voltage applied to the load 50 can be raised without substantially supplying any new electrical power. In the result, by storing the electrical power refluxed from the load 50 in the power supplies, it becomes possible to apply the drive voltage without supplying new electrical power providing the drive voltage is in a range of 0(V) through E3, and as a result, it becomes possible to significantly reduce the power consumption.

It should be noted that the explanations are presented hereinabove assuming that the load driving circuit 100 is provided with the four power supplies E1 through E4. However, by providing a larger number of power supplies, and more finely dividing the range of the voltage applied to the load 50, it is possible to expand the range of the drive voltage, which can be applied to the load 50 without supplying new electrical power. As a result, it becomes possible to more significantly reduce the power consumption. Further, similarly to the case with the first embodiment, also in the load driving circuit 100 of the second embodiment, it is also possible to apply the negative drive voltage or apply the drive voltage varying from a negative value to a positive value to the load 50.

D. Modified Examples

Besides the various types of embodiments explained hereinabove, some modified examples can be considered. Hereinafter, these modified examples will briefly be explained.

D-1. First Modified Example

In the various types of embodiments described above, the explanations are presented assuming that either of the power supplies E1 through E4 always generates the electrical power with a stable voltage value. However, there exist power supplies, such as capacitors, having the voltage value dropping as the electrical power is supplied, or power supplies, such as secondary batteries, not necessarily generating the electrical power with a stable voltage value. Further, there can be caused the case in which it is difficult to supply the electrical power with a stable voltage value because the electrical power to be supplied to the load 50 is too much in comparison with the capacity of the power supply. In such a case, it is also possible to monitor the value of the voltage generated by each of the power supplies, and switch the switches SN1 through SN4 or the switches SPO through SP3 so that the power supply generating the voltage with the optimum value is coupled to the load 50 in accordance with the drive voltage to be applied to the load 50.

Figure 10:
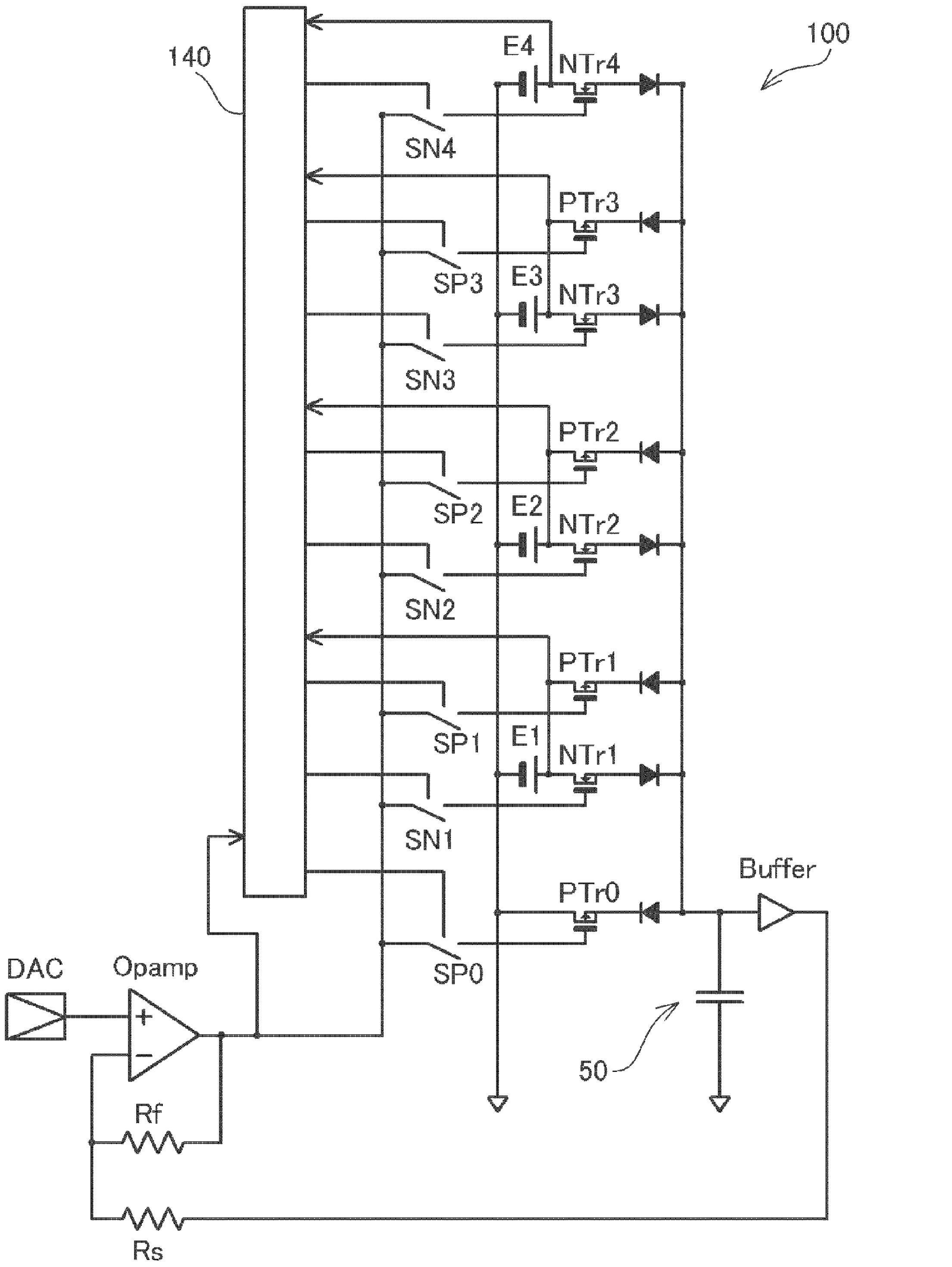
FIG. 10 is an explanatory diagram exemplifying a load driving circuit of a first modified example.

FIG. 10 is an explanatory diagram exemplifying the load driving circuit 100 of such a first modified example. In the load driving circuit 100 shown in FIG. 10, the values of the voltages generated by the power supplies E1 through E4, and the drive voltage (the output voltage of the DAC) to be applied to the load 50 are input to the gate selector circuit 140. Further, the gate selector circuit 140 switches the switches SN1 through SN4 or the switches SPO through SP3 in accordance with whether the drive voltage rises or falls, the drive voltage value, and the values of the voltages generated by the respective power supplies. For example, if the drive voltage is rising, the gate selector circuit 140 switches ON the corresponding one of the switches SN1 through SN4 so that the electrical power is supplied to the load 50 from the power supply with the lowest voltage value among the power supplies generating the voltage with the value a predetermined amount higher than the drive voltage. In contrast, if the drive voltage is falling, the gate selector circuit 140 switches ON the corresponding one of the switches SPO through SP3 so that the electrical power of the load 50 is refluxed to the power supply with the highest voltage value among the power supplies generating the voltage with the value a predetermined amount lower than the drive voltage. According to the operation described above, even in the case in which the value of the voltage generated by each of the power supplies is not stable, it becomes possible to apply the appropriate drive voltage to the load 50 while reducing the power consumption.

D-2. Second Modified Example

Further, in the various types of embodiments described above, the explanations are presented assuming that the drive voltage applied to the load 50 is directly input to the operational amplifier Opamp to perform the negative feedback control. However, it is also possible to input the drive voltage into the operational amplifier Opamp after once dividing the drive voltage instead of inputting the drive voltage directly into the operational amplifier Opamp.

Figure 11:
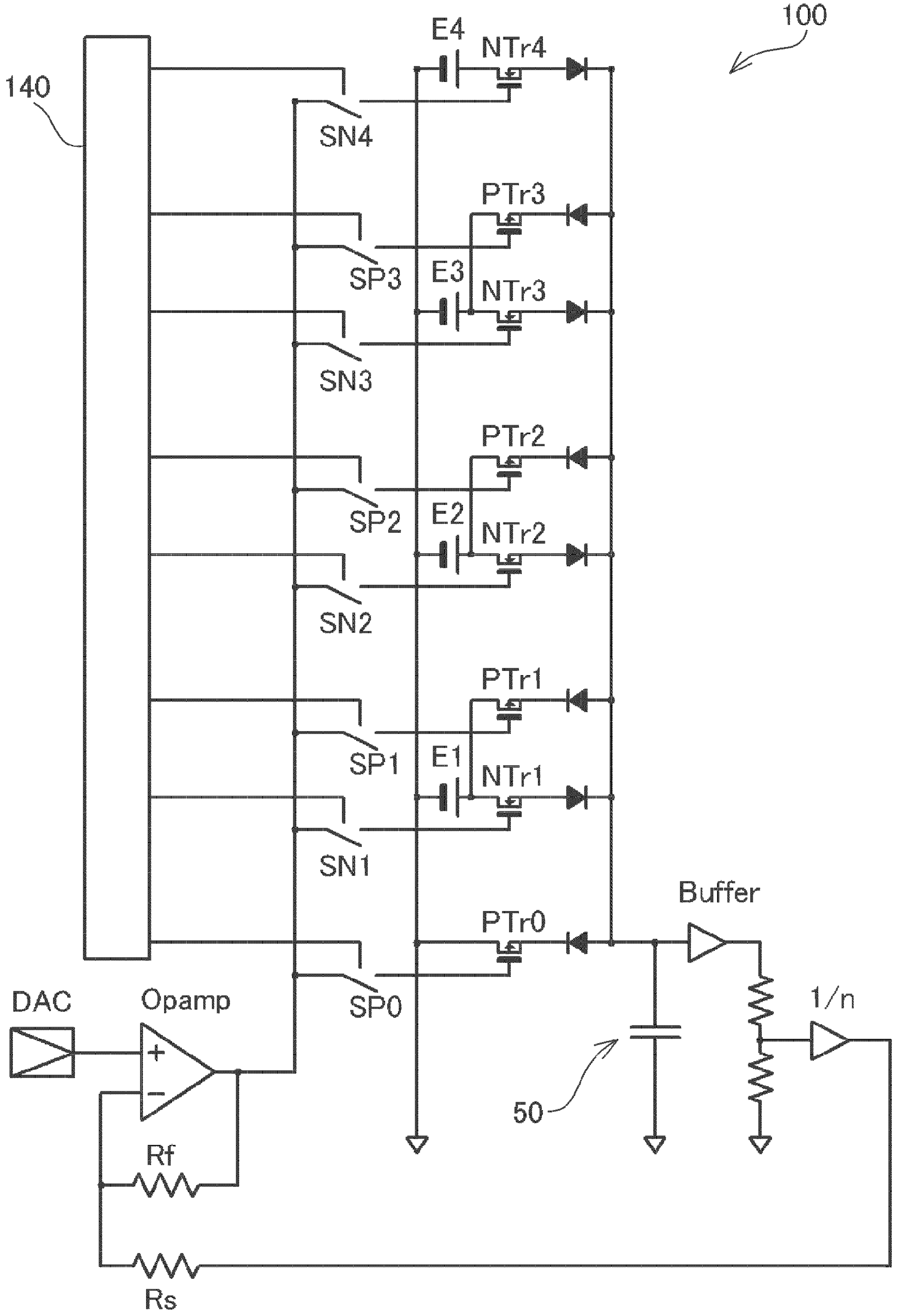
FIG. 11 is an explanatory diagram exemplifying a load driving circuit of a second modified example.

FIG. 11 is an explanatory diagram exemplifying the load driving circuit 100 of such a second modified example. In the load driving circuit 100 shown in FIG. 11, the drive voltage applied to the load 50 is divided into 1/n by a voltage divider circuit using resistors, and then input to the operational amplifier Opamp. According to this configuration, the voltage generated by the DAC can be a voltage as low as 1/n of the drive voltage to be applied to the load 50. Therefore, it becomes possible to control the drive voltage with a large variation using the DAC with a small output range.

Although the various types of load driving circuits are explained hereinabove, the invention is not limited to the entire embodiments described above, but can be put into practice in various forms within the scope or spirit of the invention.

For example, since so-called inkjet printers emit jets of ink by driving piezoelectric elements as capacitive loads, the various types of load driving circuit 100 described above can preferably be used as the load driving circuit for driving the piezoelectric element. Alternatively, since liquid crystal panels also have large amount of parasitic capacitance generated therein, and are a type of capacitive load, the various types of load driving circuits 100 described above can preferably be used for the driving circuit of the liquid crystal panel.

The entire disclosure of Japanese Patent Application No. 2008-153907 filed on Jun. 12, 2008 is expressly incorporated by reference herein.

What is claimed is:

1. A load driving circuit adapted to generate a desired voltage waveform to drive a load including a capacitive component, the load driving circuit comprising:

a target voltage waveform output section adapted to output a target voltage waveform to be applied to the load;

a plurality of power supply sections having a secondary battery or a capacitor which is capable of storing electronic power supplied thereto and generating electrical power with voltage values different from each other;

a plurality of negative feedback control sections disposed between the power supply sections and the load so as to correspond respectively to the power supply sections, and adapted to supply electrical power from the respective power supply sections to the load, and execute negative feedback control of the voltage value applied to the load for matching the voltage value and the target voltage waveform with each other;

a power supply connection section adapted to select one of the power supply sections based on one of the voltage value applied to the load and the voltage value of the target voltage waveform, and connect the selected power supply section to the load and disconnect the rest of the power supply sections from the load;

a first leading portion having a plurality of diodes and transistors disposed between the power supply sections and the load, the plurality of diodes and bipolar transistors oriented for supplying electric current from the power supply section to the load while preventing back-flow of electric current from the load to the power supply section; and a second leading portion having a plurality of diodes and transistors disposed between the power supply sections and the load, the plurality of diodes and transistors oriented for supplying electric current from the load to the power supply section while preventing back-flow of electric current from the power supply section to the load, wherein when raising the voltage value applied to the load, the power supply connection section electrically connects one of the diodes and transistors or the combination of transistors and diodes of the first leading portion between the load and a selected power supply section in order to generate the voltage with a value higher than the voltage value to be connected to the load, and the electronic power stored in the power supply section is supplied to the load through the first leading portion, wherein when dropping the voltage value applied to the load, the power supply section electrically connects one of the diodes and transistors or the combination of transistors and diodes of the second leading portion between the load and a selected power supply section in order to generate the voltage with a value lower than the voltage value to be connected to the load;

wherein the diodes in the first leading portion have an opposite orientation than the diodes in the second leading portion.

2. The load driving circuit according to claim 1, wherein when dropping the voltage value applied to the load, the electronic power stored in the load is supplied to the power supply section through the second leading portion.

3. The load driving circuit according to claim 1, wherein the negative feedback control section includes at least one of the first leading portion and the second leading portion.

4. The load driving circuit according to claim 1, further comprising:

a power supply voltage detection section adapted to detect the voltage value generated by the power supply sections separately for each of the power supply sections, wherein the power supply connection section selects one of the power supply sections to be connected to the load based on the voltage value detected respectively for the power supply sections.

5. The load driving circuit according to claim 1, wherein the power supply connection section includes a first switching unit having plurality of switches disposed between the power supply sections and plurality of diodes and bipolar transistors of the first leading portion, and a second switching unit having a plurality of switches disposed between the power supply sections and the plurality of diodes and bipolar transistors of the second leading portion.

6. The load driving circuit according to claim 5, wherein when raising the voltage value applied to the load, one of the switches of the first switching unit is connected and the other switch of the first switching unit and the second switching unit is disconnected, wherein when dropping the voltage value applied to the load, one of the switches of the second switching unit is connected and the other switch of the second switching unit is connected and the other switch of the second switching unit and the first switching unit is disconnected.

7. A ink jet printer comprising:

a piezoelectric element configured to jet ink; and a load driving circuit according to claim 1 configured to drive the piezoelectric element as the load.

8. A liquid crystal panel comprising:

a load driving circuit according to claim 1 configured to be used for a driving circuit of the liquid crystal panel.

* * * * *